United States Patent [19]

Cockrum et al.

[11] 4,057,705

[45] Nov. 8, 1977

[54] FUME EXTRACTING WELDING GUN

[75] Inventors: Herbert D. Cockrum; Charles E. Kater, both of Decatur, Ill.

[73] Assignee: Caterpillar Tractor Co., Peoria, Ill.

[21] Appl. No.: 566,599

[22] Filed: Apr. 9, 1975

Related U.S. Application Data

[63] Continuation of Ser. No. 412,454, Nov. 2, 1973.

[51] Int. Cl.² .................. B23K 9/00

[52] U.S. Cl. .................. 219/130; 219/74; 219/136

[58] Field of Search .................. 219/74, 130, 136

[56] References Cited

U.S. PATENT DOCUMENTS

| | | | |
|---|---|---|---|
| 2,995,647 | 8/1961 | Bernard | 219/130 |
| 3,018,360 | 1/1962 | Engel | 219/130 |
| 3,197,611 | 7/1965 | Morris et al. | 219/130 |
| 3,230,343 | 1/1966 | Nagy | 219/130 |
| 3,324,225 | 7/1967 | Thostrup | 219/130 |
| 3,418,446 | 12/1968 | Claussen | 219/130 |
| 3,629,547 | 12/1971 | Kester | 219/130 |
| 3,798,409 | 3/1974 | Troyer et al. | 219/130 |
| 3,878,354 | 4/1975 | Frantzreb, Sr. | 219/74 |
| 3,909,586 | 9/1975 | Landis et al. | 219/130 |

FOREIGN PATENT DOCUMENTS

| | | |
|---|---|---|
| 1,094,703 | 12/1967 | United Kingdom. |

*Primary Examiner*—J. V. Truhe
*Assistant Examiner*—Clifford C. Shaw
*Attorney, Agent, or Firm*—Phillips, Moore, Weissenberger, Lempio & Majestic

[57] ABSTRACT

A compact, flexible, lightweight welding gun is provided, including a single outer tubular casing substantially containing all the weld gun components. Concentric disposition of annular fume evacuating passageways between the outer tubular casing and component electrical transmitter elements insulates the external surfaces of the casing from the electrical heat sources within the gun, while cooling gases circulating in the gas passageways promote dissipation of accumulating heat. The improved cooling properties of the gun permit relatively higher levels of current and therefore increased speed of weld bead deposition, while the single conduit structure of the welding apparatus renders it more compact, flexible and lightweight, as well as more maneuverable due to the relatively clean exterior of the gun.

3 Claims, 2 Drawing Figures

FUME EXTRACTING WELDING GUN

This is a continuation of of Ser. No. 412,454, filed Nov. 2, 1973.

BACKGROUND OF THE INVENTION

This invention relates to a welding apparatus for gas-shielded arc welding operations. This invention relates in particular to welding guns for such welding operations which effectively remove fumes from the vicinity of the arc-welding zone, yet at the same time is convenient to use.

Arc-welding operations are known to produce undesirable fumes during the welding process, many of them,such as certain oxides of nitrogen or carbon, being particularly noxious to the welder or others in the vicinity of the welding operation. Such fumes when allowed to accumulate in confined spaces have long been known to constitute a safety hazard, as well as an interference to welder visibility and general welding operation efficiency, and numerous means have been employed by the welding industry to dissipate these fumes as they are generated.

Measures have been taken to provide generally adequate air ventilation in the welding area, where possible; however, this is frequently not possible when for example the welding operation must be accomplished in a confined space. Additionally, suction fans in cooperation with adjustable flexible tubes containing a hooded open end or duct have been used near the welding zone for fume exhaustion: these exhaust means have the disadvantages of requiring relocation of the duct as the arc welding zone changes, and, further, of interfering with the flow of shielding gas to the welding zone in the event of improper adjustment of the vacuum or improper placement of the duct.

More typically, these fume exhaust and ventilation means have been supplemented or replaced by fume extraction devices generally comprising a conduit associated with the welding gun through which undesirable product gases of the welding operation are extracted by means of a vacuum applied to the conduit. Examplary of such welding guns are those disclosed in French Pat. No. 1,526,305; U.S. Pat. No. 3,514,567; and U.S. application Ser. No. 354,193, of common assignment herewith. These guns broadly comprise dual conduit welding guns wherein one conduit contains the conventional components of the welding apparatus, and the other conduit provides a passageway for extraction of undesirable fumes. It is further customary in the welding industry to provide known welding guns such as disclosed in U.S. Pat. No. 3,629,547 with fume extraction tubes, typically disposing these tubes alongside or immediately adjacent to the welding gun; the gun and extraction tube again thereby comprise a dual conduit structure.

These dual conduit welding gun structures are frequently cumbersome, constituting a heavy structure frequently having a relatively unwieldy cross-section, particularly adjacent the control handle and flexible connector portions of the gun.

Often, the welding wire and associated electrically conducting elements are disposed relatively proximately to the external case, resulting in relatively hot handle and connector portions of the welding gun during operation, which frequently necessitates lowering of current levels to the welding gun, thereby decreasing weld rate or speed of weld metal deposition.

Still further, many prior art welding guns are provided with multiple tubes, conduits, cables, and the like, which are formed into bundles and attached to the external surface of the welding gun. These bundles frequently constitute substantial projections, which are susceptible to being snagged, these interfering with the maneuverability of the apparatus.

SUMMARY AND OBJECTIVES OF THE INVENTION

Broadly, the welding gun of the present invention integrates the components thereof including a shielding gas conduit, a fume extraction conduit, and electrical transmitting means within a flexible outer tubular casing to provide a compact, lightweight, flexible welding gun which is highly maneuverable and not prone to snagging. The gas circulating passages therein are concentrically disposed about the electrical transmitting means throughout a substantial portion of the apparatus, thereby termally insulating the external surfaces of the casing and promoting heat dissipation by circulation of cooling gases therein.

It is therefore an object of the invention to provide a lightweight, compact, flexible welding gun which is easily maneuverable.

It is another object of the invention to provide a welding gun having relatively cooler external surfaces during operation and potentially greater weld.

It is an additional object of this invention to provide a welding gun having a lightweight, compact, flexible connector portion which is relatively cooler during operation of the apparatus.

It is yet another object of this invention to provide a welding gun having a connector portion structure wherein the electrical transmitting and fume extracting functions are efficaciously divided.

DETAILED DESCRIPTION OF THE INVENTION

Figures 1, 2:
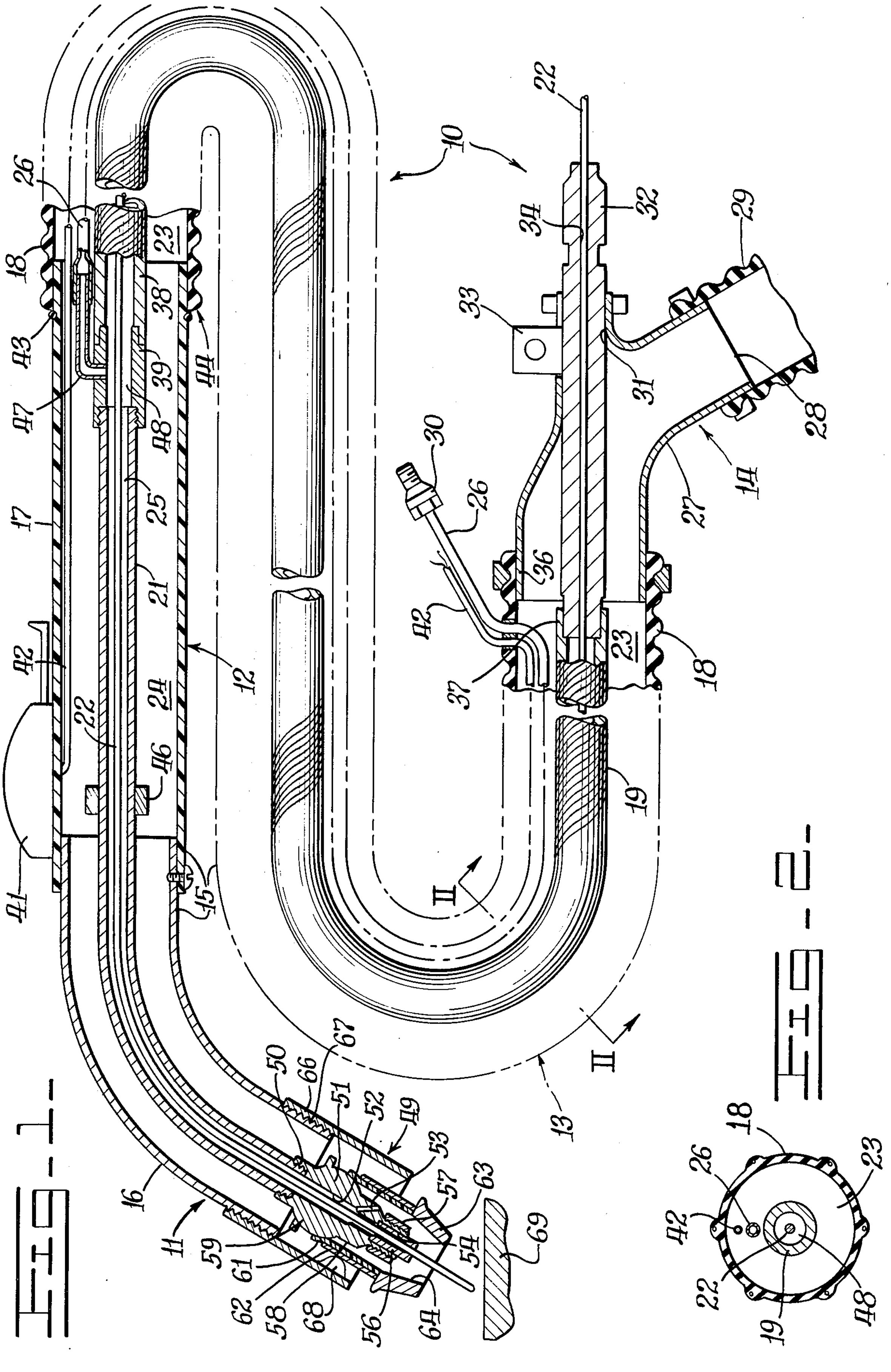
FIG. 1 is a longitudinal cross-sectional elevation of a welding gun, including the fume extraction means of this invention.
FIG. 2 is a cross-sectional elevation taken along the line II—II of FIG. 1.

With reference to the drawings, FIGS. 1 and 2 illustrate a preferred embodiment of a welding gun 10 of this invention. The gun 10 generally includes a head portion 11, a control handle portion 12, and a relatively flexible connector portion 13, which is preferably provided with elbow adapter means 14.

The components of welding gun 10 are generally contained within a tubular outer casing 15 comprising tubular housing 16 of head portion 11, tubular sheath 17 of control handle portion 12, and flexible outer tube 18 of connector portion 13, which is advantageously a helically ribbed elastomeric or plastic hose, preferably wire-reinforced for strength and durability. Flexible electrical conduit or power cable 19 and relatively rigid electrically conductive inner conduit 21 are concentrically disposed within outer tubular casing 15, forming an interconnecting annular passageway containing continuous weld wire or electrode 22.

Fume extraction means comprising interconnecting annular fume extracting passageways 23 and 24 concentrically disposed between tubular casing 15 and power cable 19, and between tubular sheath 17 and conduit 21, respectively, provide a conduit for fumes between head portion 11 and elbow adapter portion 14. Inner conduit 21 further defines a shielding gas passageway 25, into which shielding gas is fed through shielding gas feed line 26, which is coupled to a source (not shown) of shielding gas such as $CO_2$ or argon through gas connector 30.

Elbow adapter means 14 of connector portion 13 includes an elbow 27 having a cylindrical outlet 28 adapted to fit within a vacuum hose 29, connected to a vacuum source (not shown), and a cylindrical opening 31 closely fitted in encircling relationship to an elongated wire feed adapter 32. An electrical contact tab 33 is integrally connected to adapter 32 so that a source of electrical energy may be communicated thereto. Weld wire 22 is directed into a bore 34 of adapter 32 from a suitable feeding mechanism (not shown). Elbow 27 further includes a cylindrical inlet 36 adapted to fit closely within flexible outer tube 18.

Adapter 32 is grippingly embraced by power cable 19 at proximal extremity 37 thereof. Power cable 19 is of conventional multi-layer construction including an electrical transmitting layer of multiple copper wires. The distal extremity 38 of power cable 19 further grippingly embraces a second adapter 39. The electrical connection between power cable 19 and adapters 32 and 39 is preferably improved by brazing the respective connections.

Control handle portion 12 of gun 10 includes an operator control switch 41 connected to multi-wire electrical control conduit 42, which extends within the fume-extracting passageways substantially along the full length of connector portion 13, which may be as much as about 10 feet in length to give the required operational flexibility to the welder. Switch 41 is attached to tubular sheath 17 which is fitted closely within flexible outer tube 18 up to a combination O-ring seal and stop 43. Sheath 17 is preferably constructed of a non-metallic material such as plastic to prevent electrical transmission between electrical transmitter elements and the sheath. Since outer tube 18 is relatively rigid torsionally, the fit between sheath 17 and outer tube 18 is relatively loose, defining an outer slip joint 44 permitting head portion 11 and control handle portion 12 to be rotated together relative to connector portion 13 by the welder, as various angular modes of welding are pursued. The operating vacuum normally provided in fume evacuating passageways 23 collapsibly holds outer tube 18 on sheath 17.

Arched rigid inner conduit 21 is positioned within control handle portion 12 by a suitable supporting element such as clip 46, and is interconnected with power cable 19 through threadably interrelated adapter 39. Shielding gas passageway 25 of inner conduit 21 communicates with gas feed line 26 via elbow 47 passing through adapter 39. Shielding gas passageway 25 thereby serially receives shielding gas from annular passage 48 extending through adapter 39, while fume evacuating passageway 24 externally of inner conduit 21 and internally of sheath 17 is in serial communication with a vacuum established in fume extraction passageway 23.

Arched tubular housing 16 of head portion 11 is in closely supported serial relationship to sheath 17 of control handle portion 12. At the distal extremity thereof is nozzle assembly 49, which may comprise any suitable nozzle assembly which includes means to direct fumes from the arc welding zone to fume extracting passageway 24, such as that nozzle assembly described in U.S. Ser. No. 573,653, by George R. Herrick, filed May 1, 1974, now U.S. Pat. No. 4,016,398, and entitled Fume Extraction Control for Welding Gun of common assignment herewith, which is similar to illustrated nozzle assembly 49.

Generally, nozzle assembly 49 includes an adapter head 51 secured to rigid inner conduit 21 as by a plurality of threads 50. Adapter head 51 includes an internal bore 52 adapted to loosely receive welding wire 22 so that shielding gas may be circulated therearound, and a plurality of forwardly inclined passages 53 for directing shielding gas forwardly to the welding zone. A forwardly disposed counterbore 54 in adapter head 51 is adapted to tightly receive a contact tip 56 which relatively closely embraces welding wire 22 through a nut 57 threadably secured on adapter head 51.

Adapter head 51 further includes a forwardly disposed cylindrical outer surface 58 and a rearwardly disposed spherical shoulder 59 which receives thereupon an inner electrically insulating sleeve 61 and an outer containment and support sleeve 62. A nozzle 63 is brazed to the forward end of support sleeve 62, and defines a forwardly open, inwardly tapering conical cavity 64.

A tubular supporting head 66 is threadably engaged on the forward extremity of tubular housing 16 as by a plurality of threads 67, and includes a plurality of radially inwardly directed protrusions or ribs 68 adapted to space and center support sleeve 62, nozzle 63, and the adapter-related components therewithin. Ribs 68 are preferably brazed to support sleeve 62 so that threading of supporting head 66 on tubular housing 16 will effect a good seal of the shielding gas in cavity 64, by interaction of insulating sleeve 61 against spherical shoulder 59.

In operation, welding gun 10 is manipulated so that welding wire 22 is disposed substantially adjacent a workpiece 69, while at the same time operator control switch 41 is actuated. The arc welding process is thus initiated through the electrical path of least resistance, including contact tab 33, wire feed adapter 32, power cable 19, second adapter 39, inner conduit 21, adapter head 51 and contact tip 56 to weld wire 22. The current flow through the weld wire rearwardly of the tip is relatively low due to the higher resistance of the wire for the length of the welding gun 10. Flow of current is isolated from tubular support head 66 and arched tubular housing 16 because of the radially disposed nature of the internal components and the insulating qualities of inner sleeve 61.

Manipulation of operator control switch 41 concurrently operates the wire feed mechanism (not shown) which continually urges weld wire 22 towards the workpiece 69. Also, shielding gas is supplied through gas connector 30, gas feed line 26, annular passage 48, and serially related shielding gas passageway 25 in proximate cooling relation to the weld wire and inner conduit 21 immediately adjacent the control handle position 12. The shielding gas continues outward or forward flow through adapter bore 52, the plurality of passages 53, and into conical cavity 64 within nozzle 63 in such a manner that it forms an envelope around the weld wire as it is consumed in the arc, thereby preventing atmospheric contamination.

The operator control switch 41 may also simultaneously cause operation of the fume extracting portion of the welding gun 10. A vacuum is applied to the system through vacuum hose 29, withdrawing smoke and fumes generated at the welding arc along with cooling ambient air through head portion 11, and, particularly, serially related fume extraction passages 24 and 23, and elbow 27.

The concentric nature of the tubular outer casing 15, inner conduit 21 and power cable 19 and welding wire 22 of the welding gun improves the ease of handling of the unit and reduces the tendency of the connector portion to snag on surrounding objects due to its relatively clean external periphery. Improved cooling of the electrical transmitting members including the power cable and inner conduit is achieved throughout the length of the gun and connector portion by the circulation of shielding gas internally thereof and circulation of cooling air in the fume extracting passages 23 and 24 externally thereof. This increases the gun's current carrying ability and rate of deposition of the weld on the workpiece.

What is claimed is:

1. A fume extracting welding gun, through which a consumable electrode wire is fed, comprising:

a head portion having a tubular housing, an inner conduit, and a distal end thereof;

a control handle portion having a tubular sheath connected to the tubular housing, said inner conduit being disposed within the tubular sheath;

a flexible connector portion having a flexible outer tube, a flexible inner conduit, and a proximal end, said flexible outer tube being connected to the tubular sheath and said flexible inner conduit being connected to the inner conduit;

first positioning means extending inwardly from the tubular housing for concentrically maintaining the inner conduit within the head portion and defining a first annular fume extraction passageway;

second positioning means extending inwardly from the tubular sheath for concentrically maintaining the inner conduit within the control handle portion and defining a second annular fume extraction passageway, said second positioning means including a clip extending between the tubular sheath and the inner conduit;

third positioning means extending from the flexible outer tube for concentrically maintaining the flexible inner conduit within the flexible connector portion at the proximal end and defining a third annular fume extraction passageway, said first, second and third annular fume extraction passageways serially extending fully between said distal and proximal ends of the gun and having substantially common radial dimensions, said third positioning means including an elbow having a wire feed adapter, a cylindrical inlet and a cylindrical outlet, said wire feed adapter being connected to the flexible inner conduit, said cylindrical inlet being connected to the flexible outer tube, and said cylindrical outlet extending angularly outwardly from said wire feed adapter;

suction means in communication with said cylindrical outlet and the third fume extraction passageway for moving fumes from the distal end of the head portion, through the fume extraction passageways and outwardly from the gun;

means for conducting the consumable electrode wire through said wire feed adapter, said flexible inner conduit, and said inner condunits said inner conduit and said wire defining an annular shielding gas passageway;

means for conducting a shielding gas into the gun, through the annular shielding gas passageway and outwardly from the distal end of the head portion; and means for conducting electricity into the gun, through said wire feed adapter and the inner conduits, and to the consumable electrode wire at the head portion of the gun.

2. The fume extracting welding gun of claim 1 including slip joint means for rotation of the tubular sheath relative to the flexible outer tube.

3. The fume extracting welding gun of claim 2 including a seal disposed around the periphery of the tubular sheath and abutting the flexible outer tube.

* * * * *

UNITED STATES PATENT OFFICE

CERTIFICATE OF CORRECTION

Patent No. 4,057,705 Dated November 8, 1977

Inventor(s) Herbert D. Cockrum et.al.

It is certified that error appears in the above-identified patent and that said Letters Patent are hereby corrected as shown below:

Column 6, line 26, "condunits" should read --conduit,--.

Signed and Sealed this

*Twenty-fifth* Day of *April 1978*

[SEAL]

*Attest:*

RUTH C. MASON
*Attesting Officer*

LUTRELLE F. PARKER
*Acting Commissioner of Patents and Trademarks*